(No Model.)
H. U. BUCK.
SELF SETTING ANIMAL TRAP.
No. 459,453. Patented Sept. 15, 1891.
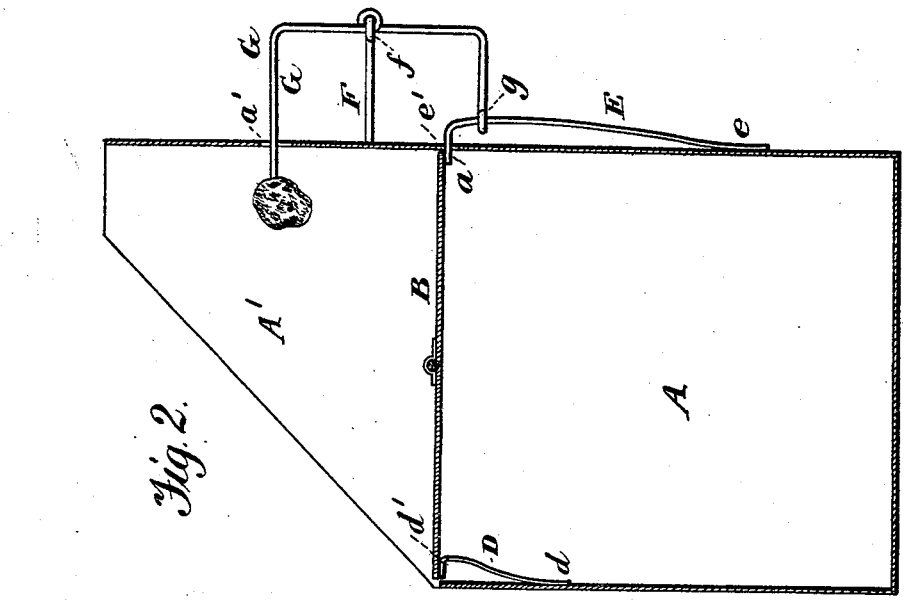
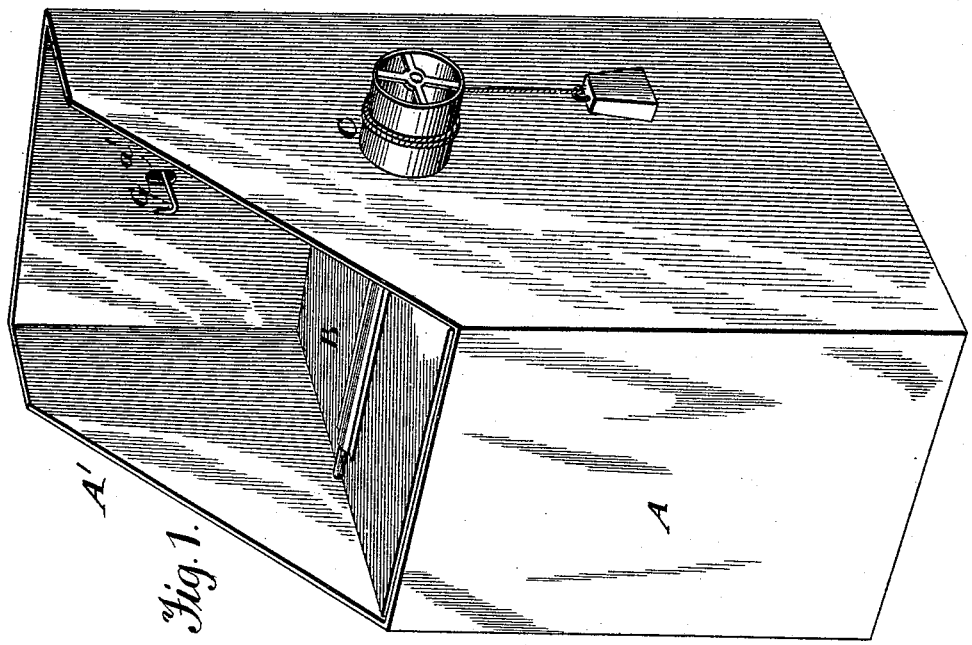
Witnesses.
A. Ruppert,
H. A. Daniels
Inventor.
Henry U. Buck
Per
Thomas P. Simpson
atty

UNITED STATES PATENT OFFICE.

HENRY URVIN BUCK, OF LEXINGTON, MISSISSIPPI, ASSIGNOR TO C. O. BUCK, OF MEMPHIS, TENNESSEE.

SELF-SETTING ANIMAL-TRAP.

SPECIFICATION forming part of Letters Patent No. 459,453, dated September 15, 1891.

Application filed January 15, 1891. Serial No. 377,856. (No model.)

*To all whom it may concern:*

Be it known that I, HENRY URVIN BUCK, a citizen of the United States, residing at Lexington, in the county of Holmes and State of Mississippi, have invented certain new and useful Improvements in Self-Setting Animal-Traps; and I do hereby declare the following to be a full, clear, and exact description of the invention, such as will enable others skilled in the art to which it appertains to make and use the same.

The special object of the invention is to make a self-setting animal-trap wherein the revolving platform shall be supported at opposite sides of the shaft by spring-catches, of which one shall be tripped by the bait-lever and the other by the rotation of the platform.

Figure 1 of the drawings is a perspective view, and Fig. 2 a vertical section at right angles to the platform-shaft.

In the drawings, A represents a vessel made of any suitable material adapted to hold liquids, and B a horizontal cover or platform journaled in the sides thereof, so as to be rotated by an end-weighted cord wound on the windlass C, formed on an outer end of said shaft.

D is a spring-catch consisting of a plate-spring secured by solder or otherwise at $d$ to the inside of vessel A, and turned at the upper end to form a flat support $d'$ for one edge of the platform.

E is a wire spring fastened on the outside of the vessel at $e$, extending upward and having the right-angled turn $e'$ at top to pass through the hole $a$ in vessel A.

On the vessel is formed the outside horizontal eye-stud F, through whose eye $f$ passes the bait-lever G. The latter also has an eye or loop $g$, through which passes the vertical spring E at its lower end, while the upper end passes through the hole $a'$ and carries the bait.

The operation is as follows: When the animal approaches the bait, which appears on the inside of the upward extension A', he is free to walk or stand on the platform B without being startled by any motion thereof, as it is supported on both sides. As soon, however, as he pulls the bait he draws out the support $e'$, and the weight-power turns the platform, so as to precipitate him into the liquid contained in vessel A, or, if it is without liquid to drown him, imprisons him. The platform turns in a half-circle until one side rests upon support $e'$, which the spring E has caused again to protrude on the inside of the vessel. One side of the platform upon reaching the spring-catch D has pressed out of its way the same, the latter resuming its place as soon as the platform has passed and forming its support on that side.

Having thus described all that is necessary to a full understanding of my invention, what I claim as new, and desire to protect by Letters Patent, is—

The vessel A, having upward extension A' and eye-stud F on the outside, the platform B, pivoted to be set horizontally, and the springs D E, arranged opposite to each other to support said platform, in combination with the lever G, having two angle-arms, of which the upper passes through extension A' to hold the bait while the lower engages the spring E, as shown and described.

In testimony whereof I affix my signature in presence of two witnesses.

HENRY URVIN BUCK.

Witnesses:
B. M. WATSON,
J. M. DYER, Jr.